United States Patent
Abriles et al.

(10) Patent No.: US 8,394,215 B2
(45) Date of Patent: Mar. 12, 2013

(54) DUAL PROCESS NICKEL ALLOY CRACK REPAIR

(75) Inventors: Beth K. Abriles, Madison, CT (US);
James J. Moor, Torrington, CT (US);
John H. Hyde, South Meriden, CT (US)

(73) Assignee: United Technologies Corporation, Hartford, CT (US)

(*) Notice: Subject to any disclaimer, the term of this patent is extended or adjusted under 35 U.S.C. 154(b) by 906 days.

(21) Appl. No.: 11/638,050

(22) Filed: Mar. 22, 2007

(65) Prior Publication Data
US 2008/0230156 A1 Sep. 25, 2008

(51) Int. Cl.
*C21D 9/00* (2006.01)
(52) U.S. Cl. .................................. 148/559; 148/525
(58) Field of Classification Search .............. 148/674, 148/528, 559, 525
See application file for complete search history.

(56) References Cited

U.S. PATENT DOCUMENTS

| | | |
|---|---|---|
| 4,493,451 A | 1/1985 | Clark et al. |
| 5,156,321 A | 10/1992 | Liburdi et al. |
| 5,873,703 A | 2/1999 | Kelly et al. |
| 5,922,150 A * | 7/1999 | Pietruska et al. ............. 148/674 |
| 6,626,228 B1 * | 9/2003 | Bewlay et al. ................ 164/463 |
| 2002/0185198 A1* | 12/2002 | Pietruska et al. ............. 148/528 |
| 2005/0067466 A1 | 3/2005 | Boegli et al. |
| 2006/0200963 A1 | 9/2006 | Lutz |
| 2007/0228108 A1 | 10/2007 | Goldschmidt et al. |

FOREIGN PATENT DOCUMENTS

| | | |
|---|---|---|
| EP | 1312437 A1 | 5/2003 |
| EP | 1561536 A1 | 8/2005 |
| EP | 1685923 A1 | 8/2006 |
| EP | 1705338 A1 | 9/2006 |
| GB | 2107628 A | 5/1983 |
| JP | 2003001478 A | 1/2003 |

* cited by examiner

*Primary Examiner* — Weiping Zhu
(74) *Attorney, Agent, or Firm* — Bachman & LaPointe, P.C.

(57) ABSTRACT

A process for repairing cracks in a workpiece, such as a turbine engine component, comprises the steps of: providing a workpiece having a crack to be repaired; applying a nickel or cobalt base alloy material to a root of the crack in an amount sufficient to fill a portion of the crack; subjecting the workpiece with the nickel or cobalt base alloy material to a first heat treatment at a temperature in the range of from about 1950 to 2300° F. for a time period in the range of from about 5.0 to 30 minutes; applying a weld material to the crack; and subjecting the workpiece with the weld material to a second heat treatment.

24 Claims, 2 Drawing Sheets

DUAL PROCESS NICKEL ALLOY CRACK REPAIR

BACKGROUND

(1) Field of the Invention

The present invention relates to a process for repairing wide cracks in a workpiece, such as a turbine engine component.

(2) Prior Art

Current materials used for repairing workpieces or components formed from a nickel based alloy used in turbine engines typically permit a maximum 0.010 inch wide crack to be repaired.

Wide gap cracks can be repaired in a variety of ways such as by standard welding. However, welding is not always feasible on turbine engine component hardware. There are repair techniques which utilize nickel base repair alloys; however, the thermal processing used in these repairs may expose the base alloy to temperatures higher than desired, negatively impacting properties.

Thus, there is a need for a repair technique which can be used to repair wide gap cracks about 0.025 inches wide or greater.

SUMMARY OF THE INVENTION

In accordance with the present invention, there is provided a process for repairing wide gap cracks in workpieces, such as turbine engine components.

In accordance with the present invention, there is provided a process for repairing cracks in a workpiece comprising the steps of: providing a workpiece having a crack to be repaired, applying a nickel or cobalt base alloy material to a root of the crack in an amount sufficient to fill a portion of the crack; subjecting the workpiece with the nickel or cobalt base alloy material to a first heat treatment at a temperature in the range of from about 1950 to 2300° F. for a time period in the range of from about 5 to 30 minutes, applying a weld material to the crack, and subjecting the workpiece with the weld material to a second heat treatment.

Other details of the dual process nickel alloy crack repair of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
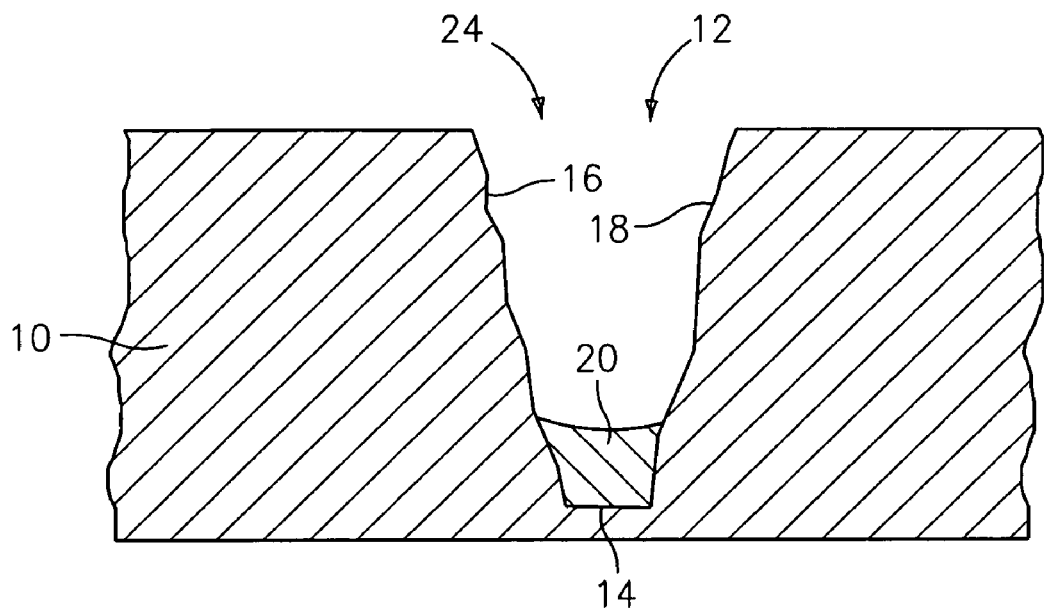
FIG. 1 is a schematic representation of a crack to be repaired having a first layer of a nickel based alloy repair material.

As noted above, the present invention relates to a process for repairing cracks in a workpiece, such as a turbine engine component, having a width larger than 0.025 inches. Referring now to FIG. 1, there is shown a workpiece 10, such as a turbine engine component, having a crack 12. The workpiece 10 may be formed from a metallic material such as a single crystal nickel based superalloy, a cobalt based superalloy, or an iron based alloy. The crack 10 has a base portion 14 and walls 16 and 18. The base portion 14 of the crack 10 is known as the root portion.

In accordance with the present invention, prior to being repaired, the crack 10 is cleaned to remove any loose material or contaminants. The crack 10 may be cleaned using any suitable cleaning method known in the art, such as fluoride ion cleaning or hydrogen cleaning.

After cleaning has been completed, an amount of a nickel or cobalt based alloy repair material 20 is applied to the base or root portion 14 of the crack 10. The repair material is present in an amount sufficient to fill in the tight portion (<0.010") of the crack. The nickel or cobalt based alloy repair material 20 may be applied in any suitable manner. For example, the repair material may be applied in the form of paint, preferably a very viscous paint. The formulation may be a TURBOFIX paint formulation. The nickel or cobalt based alloy repair material may comprise any suitable repair material known in the art. For example, the nickel based alloy repair material may be a blend of nickel based alloys. For example, the nickel based alloy repair material may be a blend of a first low melting temperature nickel based brazing alloy and a second high melting temperature nickel based alloy. In one configuration, the first low melting nickel based alloy may be present in an amount of from about 49-51 wt % and the second high melting temperature nickel based alloy may be present in amount from about 49-51 wt %. In another configuration, the first low melting temperature nickel based brazing alloy may be present in a range of from about 39 to 41 wt % and the balance may be the second high melting temperature nickel based alloy. In still another configuration, the first low melting temperature nickel based brazing alloy may be present in an amount in the range of from about 29 to 31 wt % and the balance may be the second high melting temperature nickel based alloy. In yet another configuration, the first low melting temperature nickel based brazing alloy may be present in a range of about 19-21 wt % and the balance may be the second high melting temperature nickel based alloy.

Compositions for each of the first and second nickel based alloys used to form the foregoing blended nickel base alloy repair material 20 may be found in U.S. Pat. No. 6,503,349 (from column 3, line 50 to column 4, line 44 thereof), which patent is hereby incorporated by reference herein.

Alternatively, the repair material 20 may be a nickel based alloy preferably formed from four metallic powders mixed in a binder. The powders may be mixed together and suspended in a typical industry flux free organic based brazing binder that is capable of burning off without leaving an undesirable residue when paste is heated to not higher than about 1000° F. A suitable binder is NicroBraz S binder or Vitta Braz Binder Gel. The amount of binder used will vary from manufacturer to manufacturer. For a paste form, about 8 to 15 wt % should be the binder. The four metallic powders may comprise a first nickel based braze alloy containing boron, a first nickel based filler material, a second nickel based filler material, and a low melting eutectic braze nickel based alloy. A suitable blend may contain about 40 to 60 wt % of a first nickel based braze alloy containing boron, about 15 to 35 wt % of a first nickel based filler material, and the remainder consisting of a blend of a second nickel based filler material and a low melting eutectic braze nickel based alloy.

In a preferred embodiment, the first nickel based braze alloy may contain about 6.0 to 6.8 wt % chromium, about 1.175 to 1.225 wt % boron, about 0.080 to 0.12 wt % carbon, about 5.7 to 6.1 wt % aluminum, about 0.04 to 0.12 wt % zirconium, about 12.1 to 13.0 wt % cobalt, about 1.5 to 1.9 wt % molybdenum, about 6.0 to 6.8 wt % tungsten, about 2.75 to 3.25 wt % rhenium, about 3.75 to 4.24 wt % tantalum, about 1.0 to 2.0 wt % hafnium, and the balance nickel.

Further, the first nickel based filler material may contain about 0.13 to 0.17 wt % carbon, about 8.0 to 8.8 wt % chromium, about 9.0 to 11.0 wt % cobalt, about 0.5 to 0.8 wt % molybdenum, about 2.8 to 3.3 wt % tantalum, about 0.9 to 1.2 wt % titanium, about 9.5 to 10.5 wt % tungsten, about 5.3 to 5.7 wt % aluminum, about 0.010 to 0.020 wt % boron, about 1.2 to 1.6 wt % hafnium, about 0.03 to 0.08 wt % zirconium, and the balance nickel.

Further, the second nickel base filler material may contain about 14 wt % chromium, about 10 wt % cobalt, about 3.5 wt % aluminum, about 2.75 wt % boron, about 2.5 wt % tantalum, about 0.1 wt % yttrium, and the balance nickel. A suitable material is a product commercially known as DF-4B.

Still further, the low melting eutectic braze nickel based alloy may contain about 13.5 to 16.0 wt % chromium, about 3.25 to 4.0 wt % boron, and the balance nickel. A suitable material is a product commercially known as NICROBRAZ 150.

The four powders may be blended with the binder using any suitable technique known in the art. While it is preferred that the blended nickel base repair alloy be in powder form, if desired, the blend may take the form of a paste or a paint. Alternatively, any suitable technique known in the art may be used to convert a powder form of the blend into a plate form.

The nickel base alloy repair material may have a composition consisting essentially of about 7.0 to 10.0 wt % chromium, about 4.0 to 7.0 wt % tungsten, about 3.0 to 6.0 wt % aluminum, about 1.0 to 5.0 wt % tantalum, about 0.5 to 3.0 wt % boron, about 9.0 to 11.0 wt % cobalt, about 0.5 to 2.0 wt % molybdenum, up to about 2.5 wt % rhenium, about 0.5 to 2.5 wt % hafnium, up to about 1.0 wt % titanium, up to about 0.03 wt % yttrium, and the balance nickel. In a preferred embodiment of this nickel base alloy repair material, the repair material may have a chromium content in the range of about 8.5 to 9.5 wt %, a tungsten content in the range of about 5.0 to 6.2 wt %, an aluminum content in the range of about 4.0 to 5.0 wt %, a titanium content in the range of about 0.15 to 0.4 wt %, a tantalum content in the range of about 3.0 to 4.0 wt %, a boron content in the range of about 1.0 to 1.5 wt %, a cobalt content in the range of about 10 wt % to 11 wt %, a molybdenum content in the range of about 0.9 to 1.3 wt %, a rhenium content in the range of about 1.0 to 2.0 wt %, a hafnium content in the range of about 1.0 to 1.3 wt %, and a yttrium content in the range of about 0.01 to 0.02 wt %. The rhenium improves high temperature creep, while yttrium is a grain boundary strengthener.

Following the nickel or cobalt based alloy repair material application step, the workpiece and the repair alloy are preferably subjected to a heat treatment for a time period in the range of about 5.0 to 30 minutes at a temperature in the range of from about 1950 to 2300° F., preferably from about 2175 to 2240° F.

Figure 2:
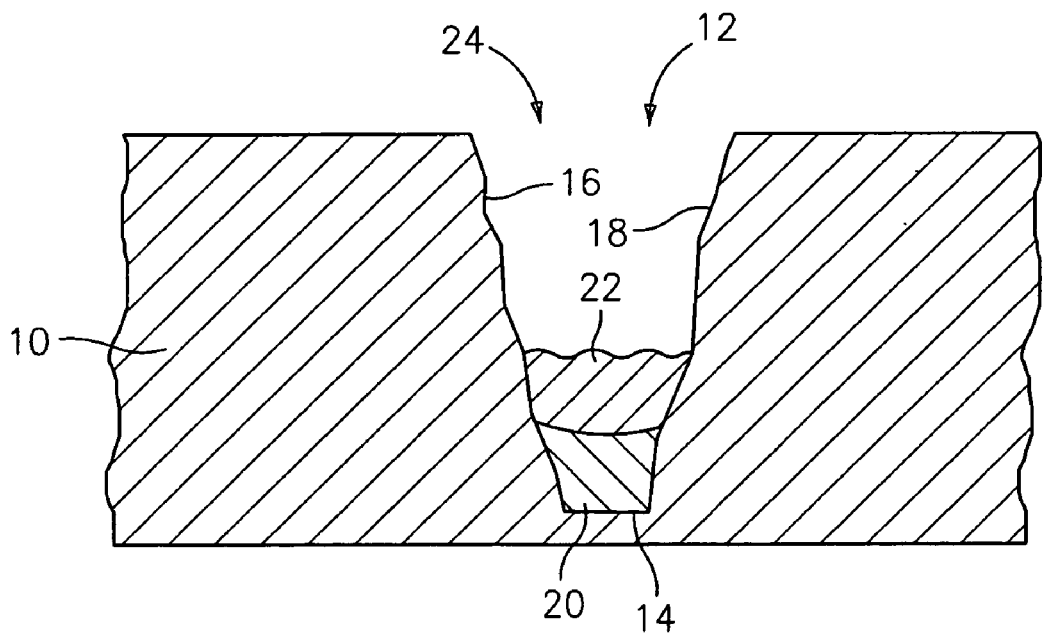
FIG. 2 is a schematic representation of the crack of FIG. 1 having a layer of weld material deposited over the first layer.

Following the heat treatment, the workpiece 10 is allowed to cool. When cooled, the nickel or cobalt based alloy repair material tends to form a bowl like surface with the walls 16 and 18 of the crack 12. Thereafter, a weld material 22 is deposited over the layer of nickel or cobalt based alloy repair material 20 as shown in FIG. 2. The weld material 22 may comprise any composition known in the art provided that it is compatible with the material forming the workpiece 10. The weld material 22 may be deposited using any suitable welding technique known in the art. The weld material can be applied using electro spark deposition, laser, micro-GTAW, micro-PAW, electron beam (EBW). The weld thus formed does not need to be metallurgically bonded to the nickel or cobalt based alloy repair material 20 or to the material forming the walls 16 and 18 of the crack. In fact, the colder the weld, the better the crack repair. The weld's main function is to act as a filler to assist in repairing the wide area 24 of the crack 10. The weld material assists in providing a medium for diffusion which is important when doing a low temperature or short duration diffusion cycle. A preferred weld material is PWA 795 or PWA 36946. The weld material is applied until flush with the top of the crack on the component.

Figure 3:
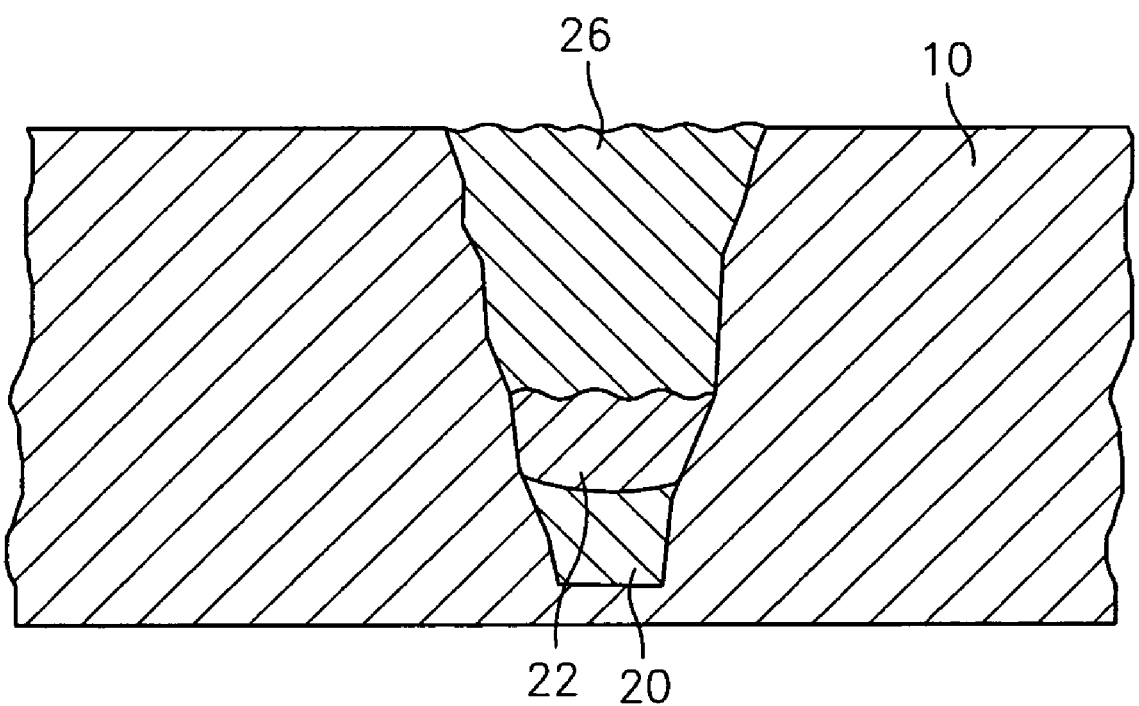
FIG. 3 is a schematic representation of the crack of FIG. 1 having a second layer of a nickel base alloy repair material deposited over said layer of weld material.

After application of the weld material 22, a second layer 26 of a nickel or cobalt based alloy repair material is deposited over the weld material 22 as shown in FIG. 3. The nickel or cobalt based alloy repair material used for the layer 26 may be the same as that used for the first layer 20 or it may be a different nickel or cobalt based alloy repair material. The nickel or cobalt based alloy repair material forming the layer 26 is applied in an amount sufficient to cover the surface and any remaining imperfections. The repair material preferably fills the wide area 24 of the crack 10. The nickel or cobalt based alloy repair material forming the layer 26 may be applied in any suitable form. For example, it may be applied as a paint and/or a paste.

After the nickel or cobalt based alloy repair material forming the layer 26 has been applied, the workpiece 10 is subjected to a further heat treatment at about 1950 to 2300° F. for a time period in the range of from about 1.0 to 20 hours. This thermal processing step may be varied depending upon the material properties to be achieved.

As can be seen from the foregoing discussion, there has been provided a process for repairing wide cracks such as those having a width greater than about 0.025 inches.

The process of the present invention can be beneficial for repairing cracks in turbine engine components formed from a single crystal nickel based superalloy where thermal processing can be damaging to creep properties. The process of the present invention may be used to repair cracks having a width between about 0.025 to 0.040 inches.

It is apparent that there has been provided in accordance with the present invention a dual process nickel alloy crack repair which fully satisfies the objects, means, and advantages set forth hereinbefore. While the present invention has been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A process for repairing cracks in a workpiece comprising the steps of:
   providing a workpiece having a crack to be repaired;
   applying a first layer of a nickel or cobalt base alloy material to a root of said crack in an amount sufficient to fill a portion of the crack;
   subjecting said workpiece with said nickel or cobalt base alloy material to a first heat treatment at a temperature in the range of from about 1950 to 2300° F. for a time period in the range of from about 5.0 to 30 minutes;
   depositing a weld material which assists in providing a diffusion medium having a composition different from said nickel or cobalt base alloy material to said crack using a welding technique subsequent to said first heat treatment;
   depositing a second layer of a nickel or cobalt based alloy repair material over the weld material; and subjecting said workpiece with said second layer of a nickel or cobalt based alloy repair material and said weld material to a second heat treatment.

2. The process of claim 1, wherein said step of subjecting said workpiece to a first heat treatment comprises heating said workpiece with said nickel or cobalt base alloy material to a temperature in the range of about 2175 to 2240° F.

3. The process of claim 1, wherein said step of providing a workpiece comprises providing a turbine engine component having a crack to be repaired.

4. The process of claim 1, wherein said step of providing a workpiece comprises providing a turbine engine component formed from a single crystal nickel based superalloy.

5. The process of claim 1, wherein said nickel or cobalt base alloy applying step comprises applying said nickel or cobalt base alloy material in paint form to the crack root.

6. The process of claim 1, wherein said nickel or cobalt base alloy material applying step comprises applying a nickel base alloy repair material comprising a blend of nickel based alloys.

7. The process of claim 1, wherein said nickel base alloy material applying step comprises applying a nickel base alloy repair material comprising a blend of a low melting temperature nickel based alloy brazing alloy and a high melting temperature nickel based alloy.

8. The process of claim 1, wherein said weld material applying step comprises applying a material which is compatible with a material forming said workpiece.

9. The process of claim 1, wherein said weld material depositing step comprises welding said weld material to walls of said crack.

10. The process of claim 9, wherein said welding step comprises welding said material to said walls using a laser.

11. The process of claim 9, wherein said welding step comprises welding said material to said walls using an electro spark deposition technique.

12. The process of claim 9, wherein said welding step comprises welding said material to said walls using a micro-PAW technique.

13. The process of claim 9, wherein said welding step comprises welding said material to said walls using a micro-GTAW technique.

14. The process of claim 9, wherein said welding step comprises welding said material to said walls using EBW.

15. The process of claim 1, wherein said step of subjecting said workpiece to a second heat treatment comprises heating said workpiece to a temperature in the range of from about 1950 to 2300° F. for a time period in the range of about 1 to 20 hours.

16. The process of claim 1, wherein said second layer depositing step comprises applying said second layer of a nickel or cobalt base alloy material in paint form over said weld material.

17. The process of claim 1, wherein said second layer depositing step comprises applying said second layer of a nickel or cobalt base alloy material in paste form over said weld material.

18. A process for repairing a crack in a turbine engine component comprising the steps of:
providing a turbine engine component formed from a metallic material and having a crack between about 0.025 inches to about 0.040 inches to be repaired;
applying a first layer of a first nickel or cobalt base alloy repair material to a root portion of said crack;
subjecting said turbine engine component with said first nickel or cobalt base alloy repair material to a first heat treatment to adhere said nickel or cobalt base alloy repair material to the walls of said crack, to partially fill said crack, and to form a base layer;
forming a layer of weld repair material which assists in providing a diffusion medium having a composition different from a composition of said first nickel or cobalt base alloy over said base layer of said first nickel or cobalt base alloy repair material and welding said weld repair material to said walls of said crack;
applying a second layer of a second nickel or cobalt base alloy repair material on top of said layer of weld repair material; and
subjecting said workpiece with said second layer of said second nickel or cobalt base alloy repair material and said weld material to a second heat treatment for bonding said second nickel or cobalt base alloy repair material to the walls of said crack.

19. The process according to claim 18, wherein said step of applying a second layer of a second nickel or cobalt base alloy repair material comprises applying a nickel or cobalt base alloy repair material identical to said first nickel base alloy repair material.

20. The process of claim 18, wherein said first nickel or cobalt base alloy repair material applying step comprises applying a nickel base alloy repair material and said forming a layer of weld repair material comprises forming a layer of a nickel based alloy weld repair material.

21. The process of claim 18, wherein said first nickel or cobalt base alloy repair material applying step comprises applying a nickel base alloy repair material and said forming a layer of weld repair material comprises forming a layer of a cobalt based alloy weld repair material.

22. The process of claim 18, wherein said first nickel or cobalt base alloy repair material applying step comprises applying a cobalt base alloy repair material and said forming a layer of weld repair material comprises forming a layer of a nickel based alloy weld repair material.

23. The process of claim 18, wherein said first nickel or cobalt base alloy repair material applying step comprises applying a cobalt base alloy repair material and said forming a layer of weld repair material comprises forming a layer of a cobalt based alloy weld repair material.

24. The process of claim 1, wherein said weld material depositing step comprising depositing said weld material until said weld material is flush with the top of the crack on the component.

* * * * *